(12) United States Patent
Radtke

(10) Patent No.: US 7,721,835 B2
(45) Date of Patent: May 25, 2010

(54) SELF-PROPELLED WHEEL FOR BICYCLES AND SIMILAR VEHICLES

(76) Inventor: Jeffrey L. Radtke, 431 Virginia Ter., Madison, WI (US) 53726

( * ) Notice: Subject to any disclaimer, the term of this patent is extended or adjusted under 35 U.S.C. 154(b) by 185 days.

(21) Appl. No.: 11/800,691

(22) Filed: May 7, 2007

(65) Prior Publication Data
US 2007/0216129 A1    Sep. 20, 2007

Related U.S. Application Data

(63) Continuation-in-part of application No. PCT/US2006/018341, filed on May 11, 2006.

(60) Provisional application No. 60/681,870, filed on May 17, 2005.

(51) Int. Cl.
*B62K 11/00*    (2006.01)

(52) U.S. Cl. .................. 180/205; 180/206; 180/207; 180/12; 180/13; 280/277

(58) Field of Classification Search ......... 180/205–207, 180/12, 13; 280/277
See application file for complete search history.

(56) References Cited

U.S. PATENT DOCUMENTS

| | | | | |
|---|---|---|---|---|
| 2,588,889 A | * | 3/1952 | Sherwood | 180/223 |
| 4,397,369 A | * | 8/1983 | Read | 180/205 |
| 5,662,187 A | * | 9/1997 | McGovern | 180/205 |
| 5,755,304 A | * | 5/1998 | Trigg et al. | 180/65.51 |
| 5,842,535 A | * | 12/1998 | Dennis | 180/205 |
| 5,865,267 A | * | 2/1999 | Mayer et al. | 180/205 |
| 6,024,186 A | * | 2/2000 | Suga | 180/291 |
| 6,321,863 B1 | * | 11/2001 | Vanjani | 180/65.51 |
| 6,347,682 B1 | * | 2/2002 | Buchner | 180/220 |
| 6,971,467 B2 | * | 12/2005 | Katsaros | 180/205 |
| 7,156,196 B2 | * | 1/2007 | Katsaros | 180/205 |
| 2005/0067207 A1 | * | 3/2005 | Radtke et al. | 180/223 |

OTHER PUBLICATIONS

Motorcycle Chassis and Design: The Theory and Practice Tony Foale and Vic Willoughby authors 1984, Osprey Publishing Limited, London, Chapter 3, Suspension.

* cited by examiner

*Primary Examiner*—Lesley Morris
*Assistant Examiner*—Michael R Stabley
(74) *Attorney, Agent, or Firm*—William J. Connors

(57) ABSTRACT

A wheel with a self-contained drive mechanism is provided to propel (or assist in propulsion of) bicycles, tricycles, and similar vehicles. The wheel preferably takes the form of a shock absorbing detachable wheel, which is readily received within the dropouts of a bicycle frame or fork to be attached therein by a standard quick-release mechanism. Thus, the wheel may be added to (or removed from) preexisting standard bicycles and the like.

20 Claims, 8 Drawing Sheets

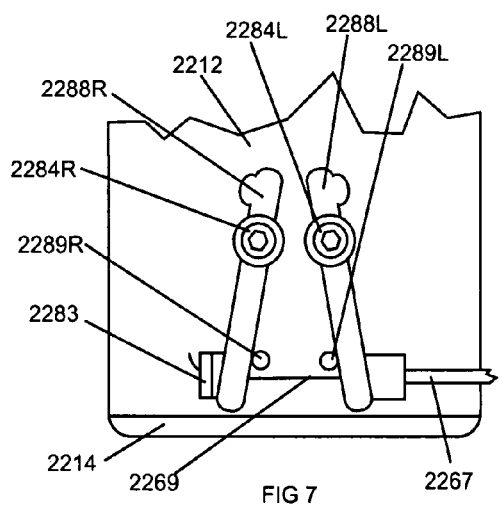
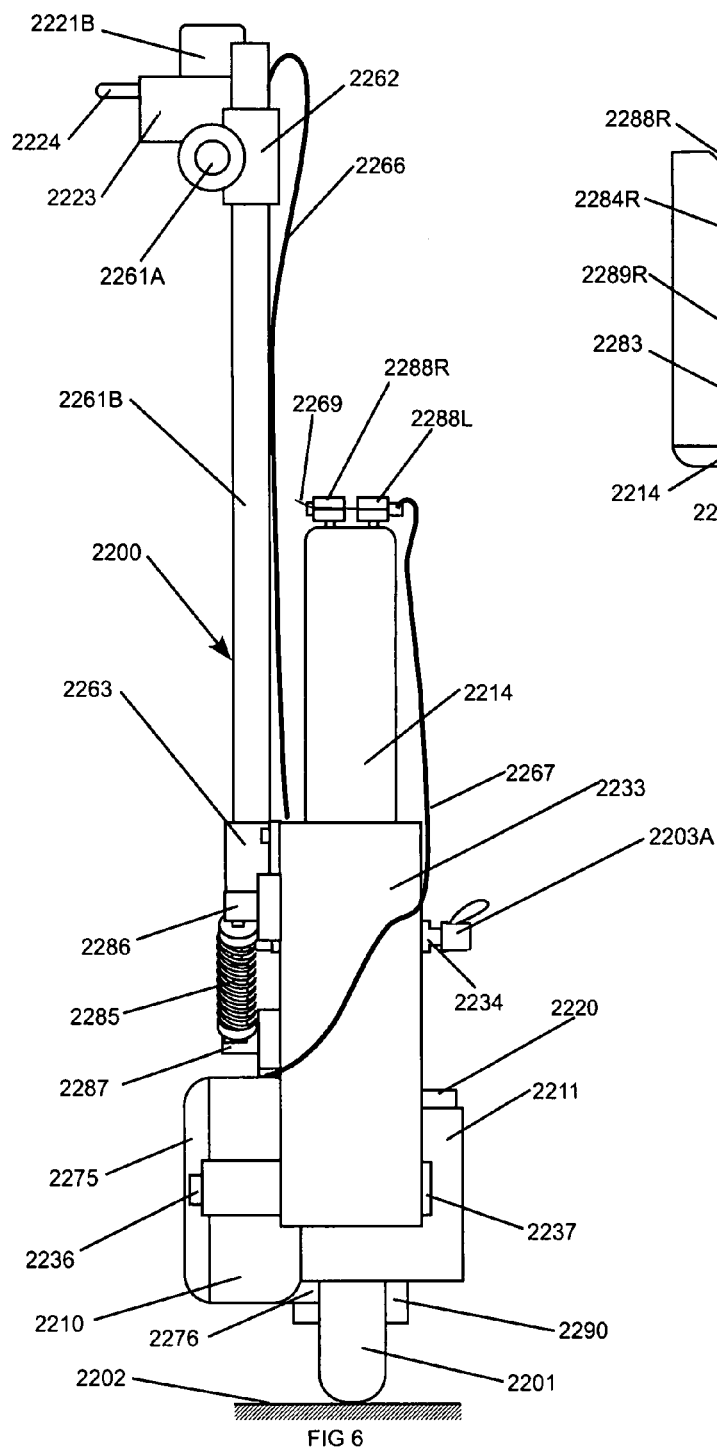
FIG 6
FIG 7

SELF-PROPELLED WHEEL FOR BICYCLES AND SIMILAR VEHICLES

CROSS-REFERENCE TO RELATED APPLICATIONS

This application is a continuation-in-part of the following International (PCT) Patent Application:
PCT/US06/18341 filed May 11, 2006; becoming
WO 2006/124543 published Nov. 23, 2006,
which itself claims the benefit of priority under 35 USC §119(e) of the following U.S. Provisional Patent Application:
60/681,870 filed May 17, 2005.

The entireties of the foregoing applications are incorporated by reference herein.

This document also incorporates by reference the U.S. patent application Ser. No. 10/993,961, filed on Nov. 19, 2004, and published as US 2005/0067207 A1 on Mar. 31, 2005. A detailed description of a new version of the invention is included in subsequent paragraphs. This new version improves upon drive durability and rider comfort by including a spring loaded shock absorber and pivot or rocker arm. This addition allows the drive wheel to move up and down as the vehicle traverses potholes and similar discontinuities in a roadway or path.

FIELD OF THE INVENTION

This document concerns an invention relating generally to devices for assisting in the propulsion of human-powered vehicles (such as bicycles), and more specifically to motor-driven wheels for bicycles.

BACKGROUND OF THE INVENTION

Bicycles, tricycles, and similar human-powered vehicles have in the past been provided with propulsion assistors which help the vehicle's operator propel the vehicle with less effort on the operator's part. Examples of such propulsion assistors are found in U.S. Pat. No. 5,755,304 to Trigg; U.S. Pat. No. 5,855,249 to Nishimura; U.S. Pat. No. 6,347,682 to Buchner; U.S. Pat. No. 6,290,014 to MacCready, Jr.; U.S. Pat. No. 6,024,186 to Suga; U.S. Pat. No. 5,865,267 to Mayer et al.; U.S. Pat. No. 5,842,535 to Dennis; U.S. Pat. No. 5,662,187 to McGovern; U.S. Pat. No. 4,906,053 to kawai; U.S. Pat. No. 4,028,915 to Stahl; U.S. Pat. No. 5,560,442 to Canderle; U.S. Pat. No. 5,341,892 to Hirose et al.; U.S. Pat. No. 5,474,150 to Mabuchi; U.S. Patent Appln. Publication 2002/0147068 to Chikaraishi; German Patent DE4000960 to Stoll; and Brazilian Patent PI 9601936-0 to Tanaka.

A common approach was to provide a roller which frictionally engaged to a vehicle wheel at the wheel's top, with the roller being driven by an electric or internal combustion engine to thereby drive the vehicle wheel. This approach has several disadvantages, e.g., it raises the center of gravity of the vehicle (which can hinder operation), and it is inefficient insofar as propulsion relies on continuously distorting the vehicle's tire.

Another approach has been to add an external cart behind or adjacent the vehicle, with the cart including a motor and serving as the propulsion assistor. This approach also carries disadvantages, e.g., it changes the handling characteristics and effective size of the vehicle.

A more recent approach has been to provide a motor in place of the hub assembly of one of the vehicle wheels. Batteries and controls for this motor are attached to the vehicle's frame. This approach is disadvantageous in that installation and removal of the propulsion assistor is time-consuming: the vehicle is not readily convertible between a solely human-powered vehicle and a propulsion-assisted vehicle. In some cases, it has been proposed to place the battery for the motor in the rotating portion of the wheel. Given the substantial mass of the battery, this increases the rotational inertia of the wheel, degrading vehicle handling and performance.

Many conventionally powered (unassisted) bicycles currently on the market include front suspension. Adding a hub motor to such a bicycle is not usually recommended because the suspension forks are not designed to withstand the added torque at the dropouts.

BRIEF DESCRIPTION OF THE DRAWINGS

A preferred version of the invention is illustrated in FIGS. 1-4, wherein.

An alternate exemplary version is illustrated in FIGS. 5-7, wherein:
FIG. 6 is an external view of the front end of the wheel of FIG. 5;
FIG. 7 is a detail of a mechanical brake actuator for the wheel of FIG. 5, as viewed from the top.

A further alternate preferred version is illustrated in FIGS. 8-11, wherein.

DETAILED DESCRIPTION OF PREFERRED VERSION OF THE INVENTION

To illustrate the invention and the various forms that it may take, following is a description of the preferred version of the invention, and several exemplary variations, which will be described with reference to the accompanying drawings.

Preferred Version of the Invention (FIGS. 1-4)

This preferred version comprises a wheel propulsion assembly. The wheel propulsion assembly comprises a suspension assembly, a motor driven rotatable wheel with a wheel axle located concentrically therein, a motor to drive said rotatable wheel, and a restraining member for preventing the wheel propulsion assembly from rotating about the fork dropouts. The suspension assembly creates a smoother ride, improving rider comfort and wheel propulsion assembly durability.

Figure 1:
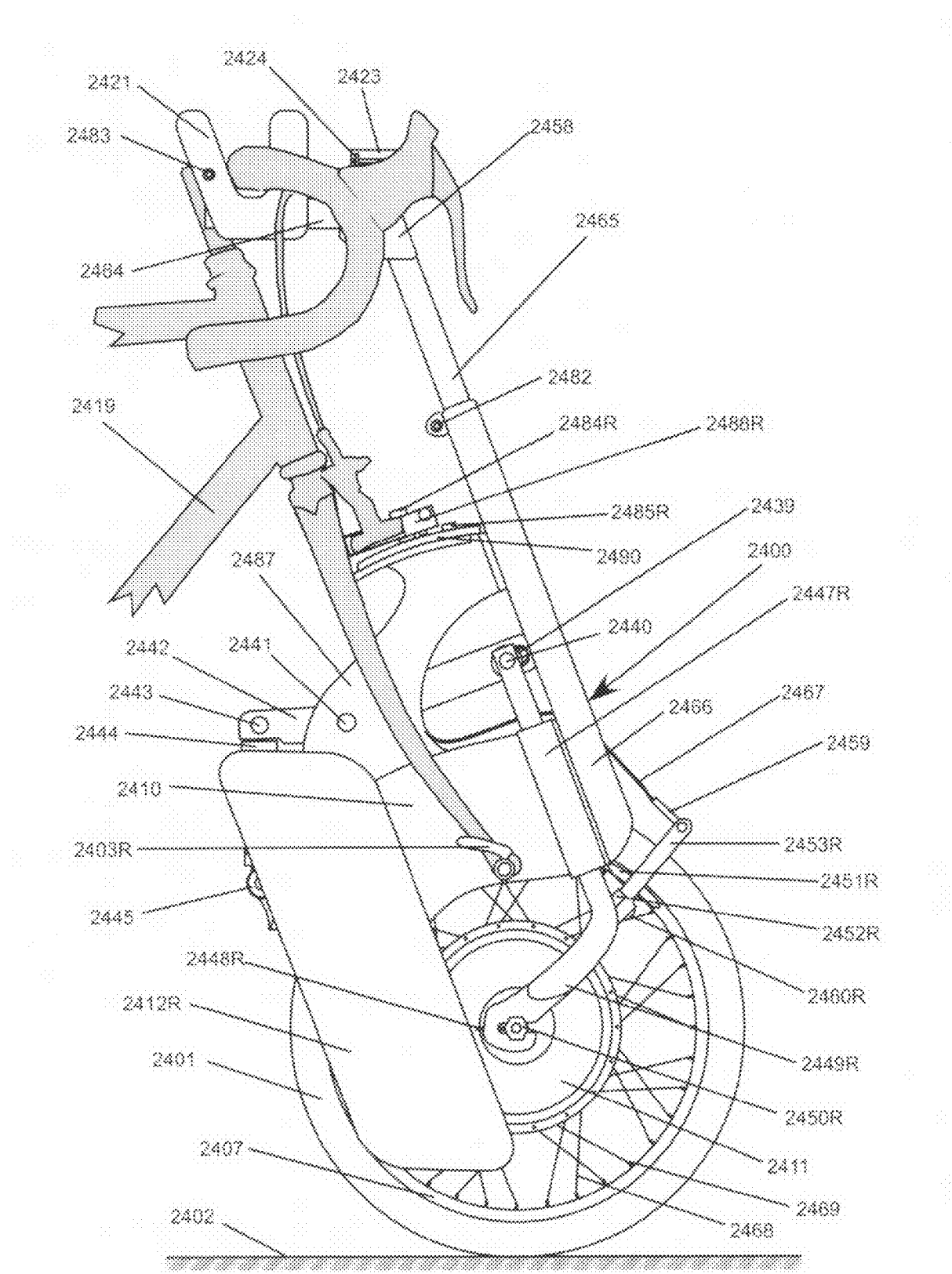
FIG. 1 is an external view of the right side of a front wheel of this invention, for a standard bicycle.

FIG. 1 shows a view of the right side of a wheel propulsion assembly 2400 specifically configured for use with a bicycle 2419. The wheel propulsion assembly 2400 includes a tire 2401, which contacts a pavement 2402 during normal use. Alternatively, the pavement 2402 may be replaced by an off-road surface at the rider's discretion. The tire 2401 is a standard pneumatic tire, similar to those commonly found on gas powered mopeds. Other types of tire will be suitable, and may be alternatively used. The tire 2401 is attached to a rim 2407 in the usual way for a tire of the indicated dimensions. The rim 2407 is similar to a standard, typically aluminum alloy, moped or BMX bicycle wheel rim. In this version of the invention, the rim 2407 is attached to and concentric with a hub motor 2411. The hub motor 2411 is similar to a model 400 series hub motor manufactured by Crystalyte and sold at www.scootonthis.com. A plurality of spoke nipples 2469 are mechanically attached to the rim 2407. The spoke nipples thread onto the ends of a plurality of spokes 2468. The spokes 2468 attach to a pair of flanges machined from either side of the hub motor 2411.

The wheel propulsion assembly 2400 attaches to a bicycle 2419 with a pair of quick release assemblies 2403LR, similar to McMaster Carr #61525K11, and performing the same function as quick release assemblies found on many bicycle wheels currently sold. The bicycle has a steering column, with a handlebar, descending to a front fork, the fork having a pair of opposing legs, each leg having a lower dropout. Note that unlike a conventional bicycle wheel, there is no "skewer" between the quick release assemblies 2403L and 2403R, and they are independently attached to protrusions on either side of a suspension housing 2410. These protrusions fit into the dropouts of the fork of the bicycle 2419. Alternatively, nuts may be used to secure the wheel propulsion assembly 2400 to the bicycle 2419, for a more permanent installation. The suspension housing 2410 is illustrated in the drawing as a solid member, but those skilled in the art will recognize that the suspension housing may be made using tubing, rods, or other acceptable techniques.

The suspension assembly comprises the suspension housing 2410 supporting a lower shock pivot 2445. The lower shock pivot 2445 connects to a suspension shock or energy absorbing system 2444 in such a manner that allows the suspension shock 2444 to rotate about the lower shock pivot 2445, in the plane of FIG. 1. The upper end of the suspension shock 2444 attaches to an upper shock pivot 2443 to allow complimentary rotation. The upper shock pivot 2443 is attached to the aft end of a suspension rocker arm 2442. The suspension rocker arm 2442 rotates about a fixed suspension pivot shaft 2441. The fixed suspension pivot shaft 2441 is rigidly attached to a support gusset 2487, which is affixed to the suspension housing 2410. The forward end of the suspension rocker arm 2442 includes a slot within which rides a fork pivot roller 2439. The fork pivot roller rotates about a secondary fork crown 2440. The secondary fork crown 2440 is attached to a pair of secondary fork blades 2449LR. Motion of the secondary fork blades 2449LR is constrained by two pairs of bushings (to be shown in FIGS. 3 and 4). These bushings are secured to the suspension housing by a pair of suspension bushing housings 2447LR. The suspension bushing housings 2447LR are rigidly affixed to the suspension housing 2410. The lower ends of the secondary fork blades 2449LR terminate in forward facing dropouts, which contain the ends of the axle of the hub motor 2411. The hub motor 2411 is secured to the secondary fork blades 2449LR by a pair of axle nuts 2450LR. Horizontal position (fore and aft) of the tire 2401 is repeatably adjusted by a pair of trail adjustment screws 2448LR. Trail may be added or subtracted by the rider, as dictated by actual performance. The suspension assembly thus described serves to allow motion of the tire 2401 in a direction substantially parallel to the steering axis of the bicycle 2419. This motion will be shown more clearly in FIG. 2. The secondary fork blades may be replaced by a single member supporting the axle of the rotatable wheel from one side. The energy absorbing system, as will be shown in FIG. 2 as a coil over a shock absorber can also be an air shock, elastomer, or any other type of shock absorbing system as will be apparent to those skilled in the art.

Figures 3, 4:
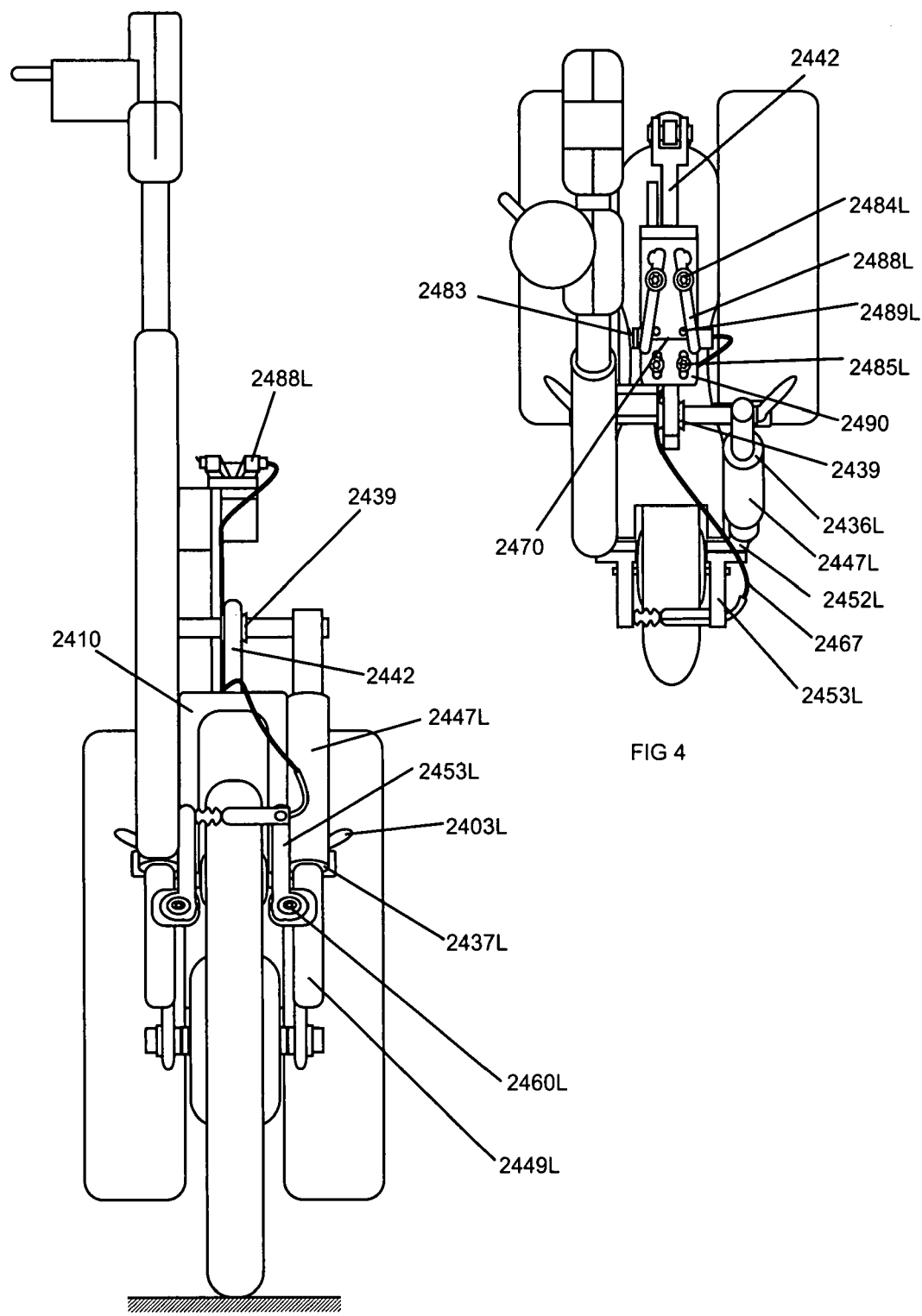
FIG. 3 is a view of the front of the wheel of FIG. 1.
FIG. 4 is a view of the top of the wheel of FIG. 1.

A brake cable sheath 2467 contains an inner brake cable 2470, as will be shown in FIG. 4. Pulling the inner brake cable forces a pair of cantilever brake arms 2453LR together, moving a pair of brake pads 2451LR into contact with the rim 2407. The lower ends of the cantilever brake arms 2453LR pivot about a pair of spring-loaded brake pivot bolts 2460LR. The cantilever brake arms 2453LR are functionally similar to cantilever brake arms currently used on many mountain bicycles. The brake pivot bolts 2460LR are threaded into a pair of brake pivot lugs 2452. The brake pivot lugs 2452LR are welded to the secondary fork blades 2449LR. The brake cable sheath 2467 terminates at a brake cable guide 2459 which is held in place on the cantilever brake arm 2453L (shown in FIG. 4) by the spring action of the brake pivot bolts 2460LR. The inner brake cable 2470 is pulled by a pair of brake interface levers 2488LR that fit between the front brake pads of the bicycle 2419. The brake interface levers swing about a pair of brake interface pivot bolts 2484LR, as will be shown more clearly in FIG. 4. The brake interface pivot bolts 2484LR are threaded into a brake interface mount flange 2490, which is curved about an arc centered on the quick release assemblies 2403LR. The curved underside of the brake interface mount flange 2490 mates with a complimentary surface on the top of the support gusset 2487. For a given wheel size, the brake pads are always the same distance from the dropouts on the fork of the bicycle 2419, so the fore and aft position adjustment of the brake interface levers 2488LR is facilitated by the curvature in the brake interface mount flange 2490. A pair of brake interface lock bolts 2485LR pass through slots in the brake interface mount flange 2490, and thread into the top of the support gusset 2487, to secure the brake interface mount flange 2490.

The suspension housing 2410 supports a battery case 2412, which encloses rechargeable battery cells. The suspension housing 2410 is composed of aluminum, but may be any other material chosen for high strength and low weight. Proper positioning of the battery case 2412 places the center of mass of the bicycle steering column slightly forward of the steering axis, dampening "shimmy," or oscillations due to roughness in the pavement 2402, yet allowing steering to occur as the bicycle is leaned from side to side. The battery case 2412R encloses a battery for driving the motor, the center of gravity of the battery being below the steering column fork dropouts.

Rotation of the suspension housing 2410 in either direction about the quick release assembly 2403LR, due to application of motor power or drag while coasting, is prevented by bringing an anti-rotation member affixed to the suspension housing 2410 into contact with the handlebar of the bicycle 2419. An anti-rotation contact pad 2421 is composed of hard rubber or similar material, and contacts the handlebar of the bicycle 2419. The anti-rotation contact pad 2421 includes a tapered recess to accommodate the handlebar of the bicycle 2419. The tapered geometry serves to minimize any adjustment that may be required to fit various bicycle handlebar diameters. A horizontal anti-rotation member 2464 is attached to the anti-rotation contact pad 2421. The horizontal anti-rotation member is attached to an anti-rotation member coupling 2458. The anti-rotation member coupling 2458 is supported by an upper anti-rotation member 2465. The upper anti-rotation member 2465 fits into a lower anti-rotation member 2466. The lower anti-rotation member 2466 is welded to the suspension housing 2410 and the support gusset 2487. Proper positioning of the anti-rotation pad 2421 on any bicycle is accomplished by loosening an anti-rotation member lock screw 2482 and a contact pad lock bolt 2483, followed by proper adjustment for handlebar geometry, and retightening. Alternatively, the anti-rotation member may contact the steering column at a point other than the handlebars.

Control of the hub motor 2411 is accomplished with a throttle control 2423. A cable (hidden in the anti-rotation assembly) carries electrical information and power to and from the throttle control 2423. The throttle control 2423 is attached to the anti-rotation member coupling 2458, so that it is close to the bicycle handlebar. A throttle control lever 2424 extends from the throttle control 2423, so that the rider can manually operate it. The throttle control 2423 may include flutes so that the rider's thumb may hold the throttle control lever 2424 in repeatable positions corresponding to cruise settings. The throttle control lever 2424 is spring loaded, so that it returns to the unpowered state as the thumb is removed. As the rider uses the hand to apply the brakes, the thumb is almost necessarily removed from the throttle control. Alternatively, the throttle control 2423 may be secured to the anti-rotation member 2464 by an adjustable arm or "gooseneck" section to accommodate other handlebar styles. The throttle control 2423 may include a momentary contact "kill switch" capable of disabling the motor through a latching relay. Restarting the motor would require pushing a "start" button or turning a keyswitch.

Figure 2:
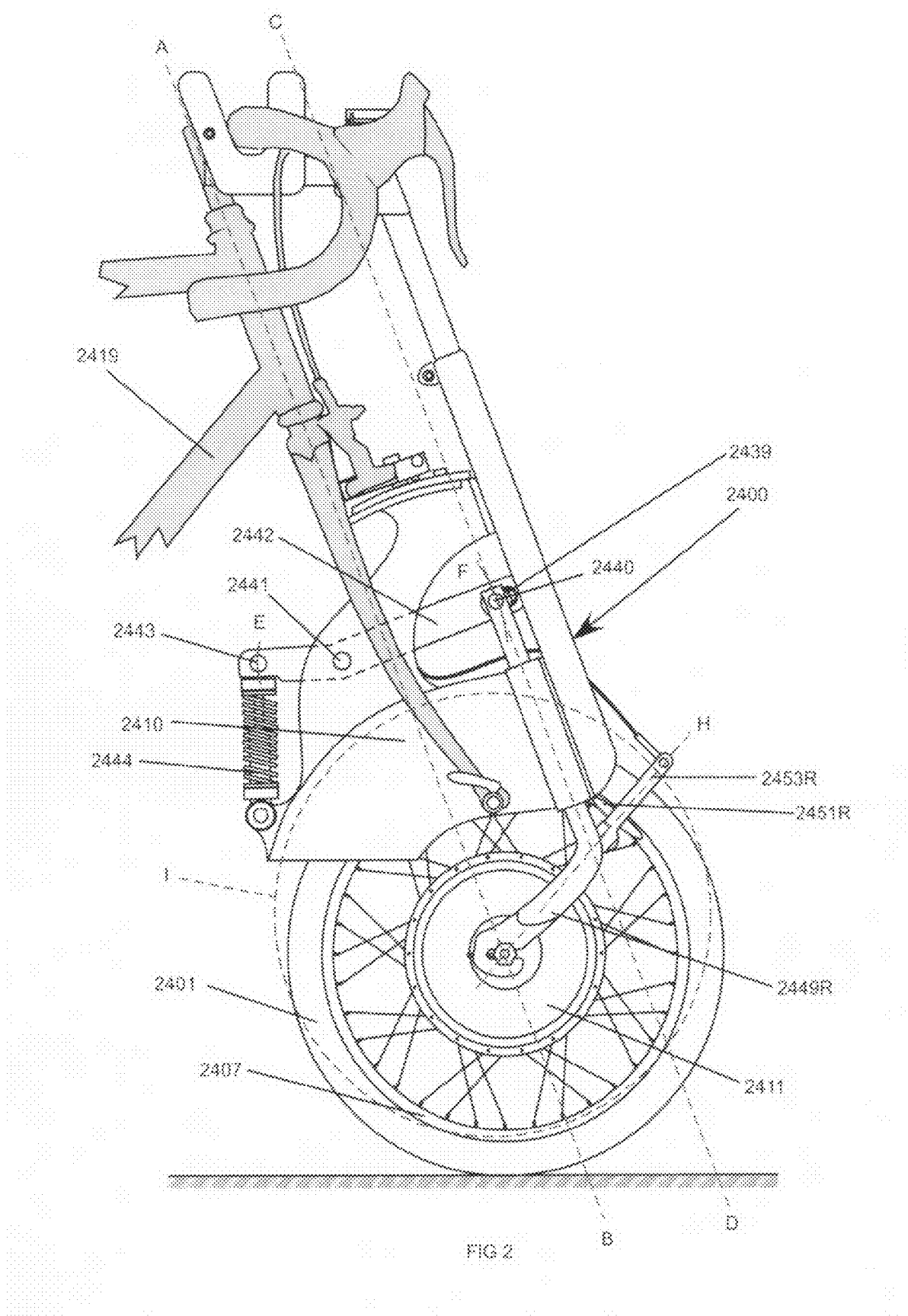
FIG. 2 is an external view of the right side of the wheel of FIG. 1, with the battery case removed to show shock absorber action.

FIG. 2 shows an external view of the right side of the wheel of FIG. 1, with the battery cases 2412LR removed to reveal shock absorber action. A dashed line through the centerline of the headset bearings indicates the steering axis AB of the bicycle 2419. The secondary fork blades 2449LR move along a shock motion axis CD. The shock motion axis CD is approximately parallel to the steering axis AB. The tire 2401 is shown in an intermediate position, as though a typical load is supported by the bicycle 2419. As the suspension shock 2444 is compressed to its minimum height, the tire 2401 moves with respect to the suspension housing 2410 to the top tire position I. The suspension rocker arm 2442 is journaled about the fixed suspension pivot shaft 2441. As the secondary fork blades 2449LR move along the shock motion axis CD, the secondary fork crown 2440 moves fore and aft with respect to the suspension rocker arm 2442. This relative motion is seen by comparing a long rocker arm arc F to the shock motion axis CD. This relative motion necessitates the inclusion of a slot in the suspension rocker arm 2442 to guide the fork pivot roller 2439. A short rocker arm arc E is drawn between the fixed suspension pivot shaft 2441 and the upper shock pivot 2443. The short rocker arm arc E is about half as long as the long rocker arm arc F, so that suspension force at the tire 2410 is halved, while range of suspension motion is doubled. A cantilever brake alignment axis H extends from the axle of the hub motor 2411 to the centerline of the cantilever brake lever 2453R, such that the brake pads 2451LR are tangent to the rim 2407.

FIG. 3 shows a front end view of the wheel propulsion assembly 2400. The wheel propulsion assembly 2400 is narrow enough to fit standard bicycles without modification. The quick release assembly 2403LR is sized according to standard dimensions, and fits into the standard bicycle fork dropout. The quick release assembly 2403LR functions in the usual way. Compression between the quick release assembly part 2403LR and protrusions in the suspension housing 2410 rigidly attaches the wheel propulsion assembly 2400 to fork dropouts of the bicycle 2419, with protrusions in the suspension housing 2410 fitting into the dropouts. The cantilever brake levers 2453LR are shown more clearly in this view.

A pair of lower suspension bushings 2437LR are press fit into the suspension bushing housings 2447LR. The lower suspension bushings 2437LR are slip fit over the secondary fork blades 2449LR.

FIG. 4 is a view of the top of the wheel of FIG. 1. This view shows more details of the mechanical brake interface system. Actuation of the existing front brake lever of the bicycle 2419 actuates the brake on the wheel propulsion assembly 2400. As the front brake of the bicycle 2419 is actuated, the existing brake pads move closer together, and would ordinarily contact the rim of a conventional bicycle wheel. When the wheel propulsion assembly 2400 is properly installed, the existing brake pads contact brake interface levers 2488LR on the protrusions shown in the top of this part as shown in FIG. 4. As the existing brake pads of the bicycle 2419 move closer together, the top halves of the brake interface levers 2488LR move closer together. Also, the brake interface levers 2488LR pivot about the pair of brake pivot bolts 2484LR, so the lower (forward) ends of the brake interface levers 2488LR move further apart. One end of the inner brake cable 2470 is affixed to the brake interface lever 2488R by a brake cable clamp bolt 2483. The brake cable sheath 2467 is affixed to a hole in the brake interface lever 2488L. The other end of the brake cable sheath 2467 and inner brake cable 2470 are terminated on a cantilever, caliper, disk or drum brake means, in the usual manner, such that a spring always applies some tension to the inner brake cable 2470. As further tension is applied to the inner brake cable 2470 by the brake interface levers 2488LR, the brake of the wheel propulsion assembly 2400 is actuated. A pair of brake interface stop pins 2489LR extend from the top of the brake interface mount flange 2490. The brake interface stop pins 2489LR simplify brake adjustment and wheel installation by providing a fixed distance between the ends of the intermediate brake levers when the brake is not actuated. The brake interface stop pins 2489LR may include adjustment screws to rest against the brake interface levers 2488LR.

A pair of upper suspension bushings 2436LR are press fit into the suspension bushing housings 2447LR. The upper suspension bushings 2436LR are slip fit over the secondary fork blades 2449LR.

Modifications to, and Other Versions of, the Invention

Various preferred versions of the invention are shown and described above to illustrate different possible features of the invention and the varying ways in which these features may be combined. Apart from combining the different features of the foregoing versions in varying ways, other modifications are also considered to be within the scope of the invention. Following is a list of such modifications.

The foregoing versions of the wheel propulsion assembly have generally been described as being installed as the front wheels in bicycles for the sake of simplicity. They might be used as rear wheels instead, or may be used for both wheels.

The invention is not intended to be limited to the preferred versions, but rather is intended to be limited only by the claims set out below. Thus, the invention encompasses all different versions that fall literally or equivalently within the scope of these claims.

Referring to FIG. 1, the anti-rotation member 2465 may support a variety of accessories, and may be extended to temporarily attach to the bicycle handlebar at several points with Velcro or another suitable quick release mechanism. Accessories may include indicators, such as battery charge or temperature; motor RPM, power, or temperature; and bicycle speed or distance traveled. Illumination accessories may include directional or brake signals, or a headlamp. A windshield may also be attached to the anti-rotation member 2465. Other drive transmission arrangements may use a belt, gears, chain or shaft, as will be apparent to those skilled in the art.

Referring to FIG. 1, a kickstand may be attached to the suspension housing 2410, such that the wheel propulsion assembly 2400 may be stored upright, independent of, or along with the bicycle 2419. The horizontal anti-rotation member 2464 can also function as a handle, to move the wheel independently of the bicycle. A pair of handles may be attached to the horizontal anti-rotation member 2464, so that a user could hold the wheel propulsion assembly 2400 with both hands, and one thumb could reach the throttle control lever 2424, while being pulled by the wheel propulsion assembly 2400 and wearing skates, or riding a skateboard or wheelchair. Addition of a hand actuated brake lever to the anti-rotation member 2464 would be required for safety with this latter refinement.

Referring to FIG. 1, the hub motor 2411 may be an internal combustion engine, and the battery case 2412 may enclose a gas or liquid fuel tank. An internal combustion engine may require a clutch to allow the motor to run without necessarily driving the wheel, a starter system, and controls for both. Internal combustion engine clutches and starters are well developed, and adaptation to this and other versions will be apparent to those skilled in the art. Alternatively, the hub motor 2411 may be replaced by a conventional motor and belt, gears, shaft or chain driven transmission. The battery case 2412 may be enclose other energy storage means, such as a fuel tank for a fuel cell or internal combustion engine, or one of many available battery chemistries, such as lead-acid, nickel-cadmium, lithium ion, zinc-air, or others. The motor may be controlled semi-autonomously.

Figure 5:
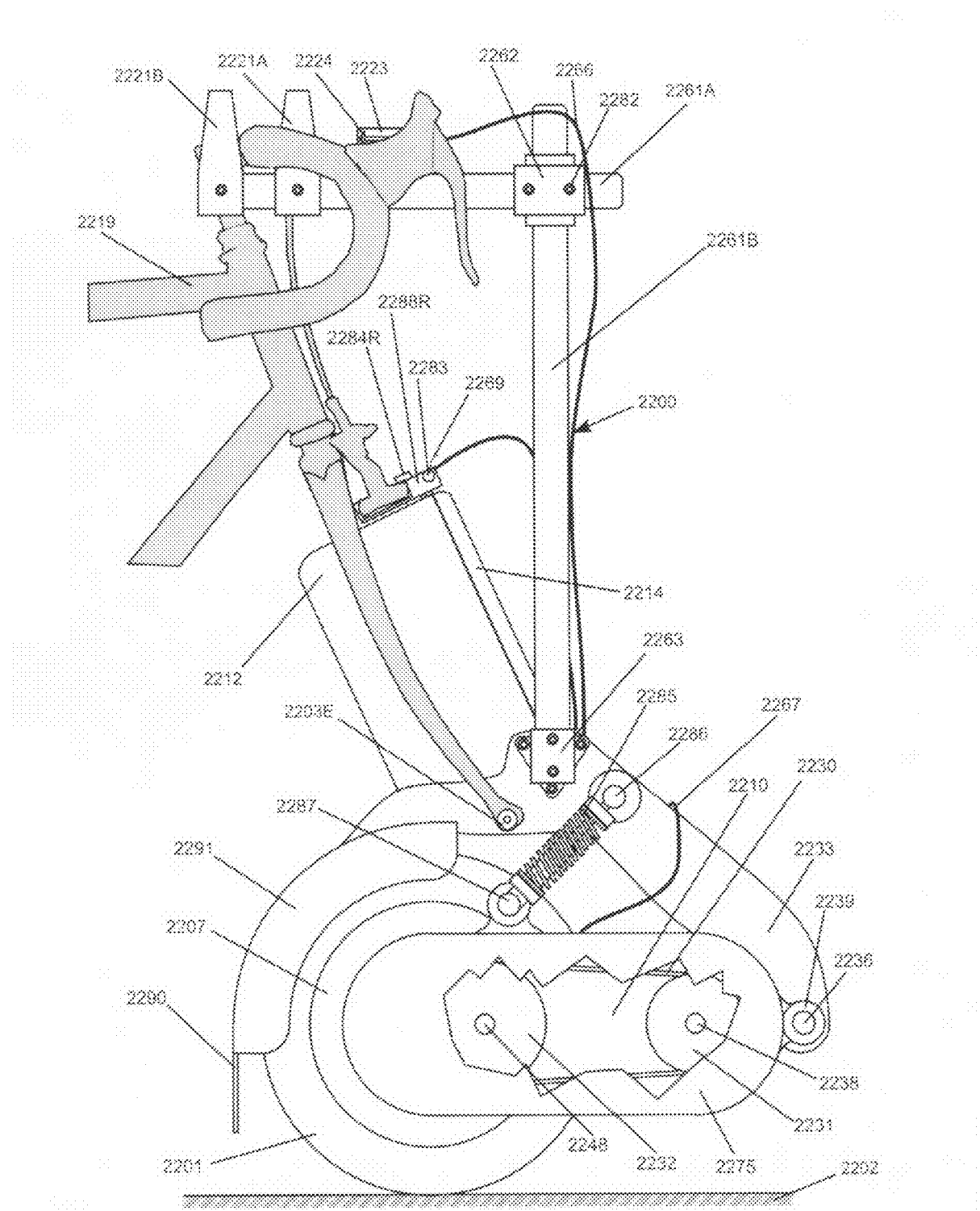
FIG. 5 is an external view of the right side of a front wheel of this invention for a standard bicycle.

Detailed Description of the Alternate Exemplary Version (FIGS. 5-7)

An alternative version of this invention is detailed in U.S. Provisional Application 60/681,870. This alternate version departs from the preferred version with the use of a pivot arm suspension system. This version enables propulsion from a motor located outside of the wheel hub. FIGS. 5 and 6 of this application demonstrate an alternative version of this invention which includes a belt driven wheel and a motor. The motor may be electric or internal combustion.

FIG. 5 shows a view of the right side of a wheel propulsion assembly 2200 specifically configured for use with a bicycle 2219. The wheel propulsion assembly 2200 includes a tire 2201, which contacts a pavement 2202 during normal use. Alternatively, the pavement 2202 may be replaced by an off-road surface at the rider's discretion. The tire 2201 is a standard pneumatic tire, similar to those commonly found on gas powered mopeds. Other types of tire will be suitable, and may be alternatively used. The tire 2201 is attached to a rim 2207 in the usual way for a tire of the indicated dimensions. The rim 2207 is similar to a standard, typically aluminum alloy, moped wheel rim. The rim 2207 is attached to and concentric with a hub housing which is not shown. The wheel propulsion assembly 2200 attaches to a bicycle 2219 with a quick release assembly 2203A-E, such as is found on many bicycles currently sold. Alternatively, nuts may be used to secure the wheel propulsion assembly 2200 to the bicycle 2219, for a more permanent installation. The bicycle has a steering column, with a handlebar, descending to a front fork, the fork having a pair of opposing legs, each leg having a lower dropout.

The quick release assembly 2203A-E secures a fixed pivot support 2233 to the front fork dropouts of the bicycle 2219. The fixed pivot support 2233 is secured to a pivot shaft 2236. A pivot shaft bushing 2239 is attached to a belt transmission housing 2210, as will be shown more clearly in FIG. 6. This allows the belt transmission housing 2210 to swing about the pivot shaft 2236, in the plane of FIG. 5.

The belt transmission housing 2210 supports a lower shock pivot 2287 at some horizontal distance from the pivot shaft 2236. The lower shock pivot 2287 connects to an energy absorbing assembly 2285 in such a manner that allows the energy absorbing assembly 2285 to rotate about the lower shock pivot 2287, in the plane of FIG. 5. The upper end of the energy absorbing assembly 2285 attaches to an upper shock pivot 2286 to allow complimentary rotation. The upper shock pivot 2286 is attached to the fixed pivot support 2233. Thus, the energy absorbing assembly 2285 provides dampening, but is not bent as the belt transmission housing 2210 swings about the pivot shaft 2236. The energy absorbing assembly 2285 shown in FIG. 5 as a coil over a shock absorber can also be an air shock, elastomer, or any other type of shock absorbing system as will be apparent to those skilled in the art.

A belt transmission cover 2275 encloses the belt transmission housing 2210 on the right side of the wheel propulsion assembly 2200. Viewing through a broken out section of the belt transmission cover 2275 reveals the belt transmission itself. A motor shaft 2238 extends from a motor 2211 that will be shown in FIG. 6. The motor shaft 2238 drives a motor pulley 2231. The motor pulley 2231 drives a transmission belt 2230. Motion of the transmission belt 2230 turns a drive pulley 2232. Rotating the drive pulley 2232 spins a drive gear shaft 2248. The drive gear shaft 2248 includes teeth on the hidden end, behind the drive pulley 2232. Teeth in the drive gear shaft 2248 mesh with teeth in a larger hidden gear that is concentric with and attached to the rim 2207. A freewheel may be included between this hidden gear and the rim 2207, and is supported by appropriate bearings or journals. Freewheel action may alternatively be provided by a centrifugal clutch installed in the drivetrain between the drive pulley 2232 and the drive gear shaft 2248. The rotational energy transmission means thus described may alternatively take several forms, as will be apparent to those skilled in the art. Such transmission means may include belts and pulleys, chains and sprockets, gears, or combinations thereof.

The belt transmission housing 2210 supports the rim 2207 by an axle and bearings in the usual manner. Those skilled in the art will recognize that the drivetrain and suspension assembly is similar in construction to the rear drive wheel of many current model gas powered moped designs, such as those manufactured by Honda (2005 Ruckus), Yamaha (2005 Zuma) and others. This drivetrain design also includes a drum brake on the drive wheel. A brake cable sheath 2267 connects to such a drum or disk brake located behind the belt transmission cover 2210. Actuation of the brake is provided through an inner brake cable 2269 by a pair of intermediate brake levers 2288LR that fit between the front brake pads of the bicycle 2219. The intermediate brake levers swing about a pair of brake pivot bolts 2284LR, as will be shown more clearly in FIG. 7. A brake cable clamp bolt 2283 secures one end of the inner brake cable 2269 to the intermediate brake lever 2288R.

The fixed pivot support 2233 attaches to a fender 2291, and the fender 2291 supports a mud flap 2290. The fender 2291 and mud flap 2290 function in the usual manner to reduce spray from the tire 2201 in wet conditions.

The fixed pivot support 2233 supports a battery case 2212, which encloses rechargeable battery cells and system electronics. The fixed pivot support 2233 is composed of aluminum, but may be any other material chosen for high strength and low weight. A battery case cover 2214 completes the battery enclosure on the front, and allows access to the battery for replacement. Proper positioning of the battery 2212 places the center of mass of the bicycle steering column slightly forward of the steering axis, dampening "shimmy," or oscillations due to roughness in the pavement 2202, yet allowing steering to occur as the bicycle is leaned from side to side. Also note that trail has been added to the steering by positioning the contact point between the tire 2201 and the roadway 2202 slightly aft of the fork dropouts of the bicycle 2219. Trail may be added or subtracted in design refinements, as dictated by actual performance.

Rotation of the fixed pivot support 2233 in either direction about the quick release assembly 2203AE, due to application of motor power or drag from freewheel action while coasting, is prevented by an anti-rotation member 2261A and 2261B. The anti-rotation member 2261 AB is attached to a pair of anti-rotation contact pads 2221A and 2221B. The anti-rotation contact pads 2221AB are composed of hard rubber or similar material, and contact the handlebar of the bicycle 2219. The tops of the anti-rotation contact pads 2221 AB are tapered, to minimize any adjustment that may be required to fit various bicycle handlebar diameters. The anti-rotation member 2261AB is fabricated from aluminum structural tubing, similar to McMaster Carr # 4699T21. Sections of the anti-rotation member 2261AB are connected together by a anti-rotation member crossover 2262, similar to McMaster Carr # 4698T23. Proper positioning of the anti-rotation pads 2221AB on any bicycle is accomplished by loosening several anti-rotation member set screws 2282 followed by proper adjustment and retightening. Alternatively, the anti-rotation member crossover 2262 may incorporate a split cylindrical design and hand actuated quick release levers for simple adjustment without the aid of tools. The bottom of the anti-rotation member 2261AB is attached to the fixed support pivot 2233 by an anti-rotation member support flange 2263, which is similar to McMaster Carr # 4698T213. Alternatively, the anti-rotation member may contact the steering column at a point other than the handlebars.

Control of the drive motor 2211 is accomplished with a throttle control 2223. A cable 2266 carries electrical information and power to and from the throttle control 2223. The throttle control 2223 is attached to the anti-rotation member 2261A, by a panel connector similar to McMaster Carr # 4698T151 (not shown), so that it is close to the bicycle handlebar. A throttle control lever 2224 extends from the throttle control potentiometer, so that the rider can reach it with the right thumb. The throttle control lever 2224 is spring loaded, so that it returns to the unpowered state as the thumb is removed. As the rider uses the hand to apply the brakes, the thumb is almost necessarily removed from the throttle control. Alternatively, the throttle control 2223 may be secured to the anti-rotation member 2261A by an adjustable arm or "gooseneck" section to accommodate other handlebar styles. The throttle control 2223 may include a momentary contact "kill switch" capable of disabling the motor through a latching relay. Restarting the motor would then require pushing a "start" button or turning a keyswitch.

FIG. 6 shows a front end view of the wheel propulsion assembly 2200. The wheel propulsion assembly 2200 is narrow enough to fit standard bicycles without modification. The quick release assembly 2203A-E is sized according to standard dimensions, and fits into the standard bicycle fork dropout. The quick release assembly 2203A-E functions in the usual way. Compression between the quick release assembly part 2203A and a pivot support protrusion 2234 rigidly attaches the wheel propulsion assembly 2200 to a bicycle fork dropout, with end of the pivot support protrusion 2234, fitting into the dropout. The quick release assembly part 2203E serves a similar function on the right side of the wheel propulsion assembly 2200.

A pivot shaft retainer 2237 ensures that the pivot shaft 2236 remains inserted in the fixed pivot support 2233. The pivot shaft retainer is a steel shaft retaining ring that fits into a groove in the pivot shaft 2236. The other end of the pivot shaft 2236 is diametrically enlarged to prevent the outer pivot shaft bushing 2239 and belt transmission housing 2210 from sliding off.

The forward end of the belt transmission housing 2210 supports a drive motor 2211, which is a compact NdBFe permanent magnet motor capable of providing 615 Watts of continuous output power, at about 88% system efficiency at 3175 rpm. The drive motor 2211 in this embodiment is similar to a brushless motor, "Extended 4 inch", currently manufactured by Transmagnetics (www.Transmag.com). A motor controller 2220 uses the signal from the throttle control to regulate the drive motor 2211 output speed, power or torque. The motor controller 2220 is a pulse width modulated controller, similar to models currently available from Transmagnetics (www.transmag.com).

A gearbox housing 2276 is attached to the belt transmission housing 2210, adjacent the rim 2207. The gearbox housing 2276 encloses a single stage reduction geartrain, and may include a drum brake.

FIG. 7 is a detail of the mechanical brake actuator for the wheel propulsion assembly of FIG. 5, as viewed from the top. This detail indicates how actuation of the existing front brake lever of the bicycle 2219 actuates the brake on the wheel propulsion assembly 2200. As the front brake of the bicycle 2219 is actuated, the existing brake pads move closer together, and would ordinarily contact the rim of a conventional bicycle wheel. When the wheel propulsion assembly 2200 is properly installed, the existing brake pads contact intermediate brake levers 2288LR on the protrusions shown in the top of this part as shown in FIG. 7. As the existing brake pads of the bicycle 2219 move closer together, the top halves of the intermediate brake levers 2288LR move closer together. Also, the intermediate brake levers 2288LR pivot about a pair of brake pivot bolts 2284LR, the lower (forward) ends of the intermediate brake levers 2288LR move further apart. The brake pivot bolts 2284LR are affixed to the battery case 2212. One end of an inner brake cable 2269 is affixed to the intermediate brake lever 2288R by a brake cable clamp bolt 2283. The brake cable sheath 2267 is affixed to a hole in the intermediate brake lever 2288L. The other end of the brake cable sheath 2267 and inner brake cable 2269 are terminated on the disk or drum brake assembly near the rim 2207, in the usual manner, such that a spring always applies some tension to the inner brake cable 2269. As further tension is applied to the inner brake cable 2269 by the intermediate brake levers 2288LR, the disk or drum brake of 2200 is actuated. A pair of brake lever stop pins 2289LR are attached to the top of the battery case 2212. The brake lever stop pins 2289LR simplify brake adjustment and wheel installation by providing a fixed distance between the ends of the intermediate brake levers when the brake is not actuated.

Alternative Variations of this Version are Described Below:

Referring to FIG. 5, the anti-rotation member 2261A may support a variety of accessories, and may be extended to temporarily attach to the bicycle handlebar at several points with Velcro or another suitable quick release mechanism. Accessories may include indicators, such as battery charge or temperature; motor RPM, power, or temperature; and bicycle speed or distance traveled. Illumination accessories may include directional or brake signals, or a headlamp. A windshield may also be attached to the anti-rotation member 2261A. Other pivot bearing arrangements will be apparent to those skilled in the art, and may include rolling elements. Other drive transmission arrangements may use a chain or shaft, as will be apparent to those skilled in the art.

Referring to FIG. 5, a kickstand may be attached to the fixed pivot support 2233, such that the wheel propulsion assembly 2200 may be stored upright, independent of, or along with the bicycle 2219. The long anti-rotation member 2261A-B can also function as a handle, to move the wheel independently of the bicycle. A pair of handles may be attached to the anti-rotation member 2261A-B, so that a user could hold the wheel propulsion assembly 2200 with both hands, and one thumb could reach the throttle control lever 2224, while being pulled by the wheel propulsion assembly 2200 and wearing skates, or riding a skateboard or wheelchair. Addition of a hand actuated brake lever to the anti-rotation member 2261A would be required for safety with this latter refinement.

Referring to FIG. 5, note that the battery case 2212 may alternatively be placed on the side of the wheel propulsion assembly 2200, outboard of the bicycle fork, or elsewhere on the bicycle 2219.

Referring to FIG. 6, the drive motor 2211 may be an internal combustion engine, and the battery case 2212 may enclose a gas or liquid fuel tank. An internal combustion engine may require a clutch to allow the motor to run without necessarily driving the wheel, a starter system, and controls for both. Internal combustion engine clutches and starters are well developed, and adaptation to this and other versions will be apparent to those skilled in the art. Alternatively, the drive motor 2211 may be a brush commutated electric motor, and the motor controller 2220 may be suitable to a brush commutated electric motor. The battery case 2412 may be enclose other energy storage means, such as a fuel tank for a fuel cell or internal combustion engine, or one of many available battery chemistries, such as lead-acid, nickel-cadmium, lithium ion, zinc-air, or others. The motor controller 2220 may be of semi-autonomous configuration.

Detailed Description of the Alternate Preferred Version (FIGS. 8-11)

Figure 8:
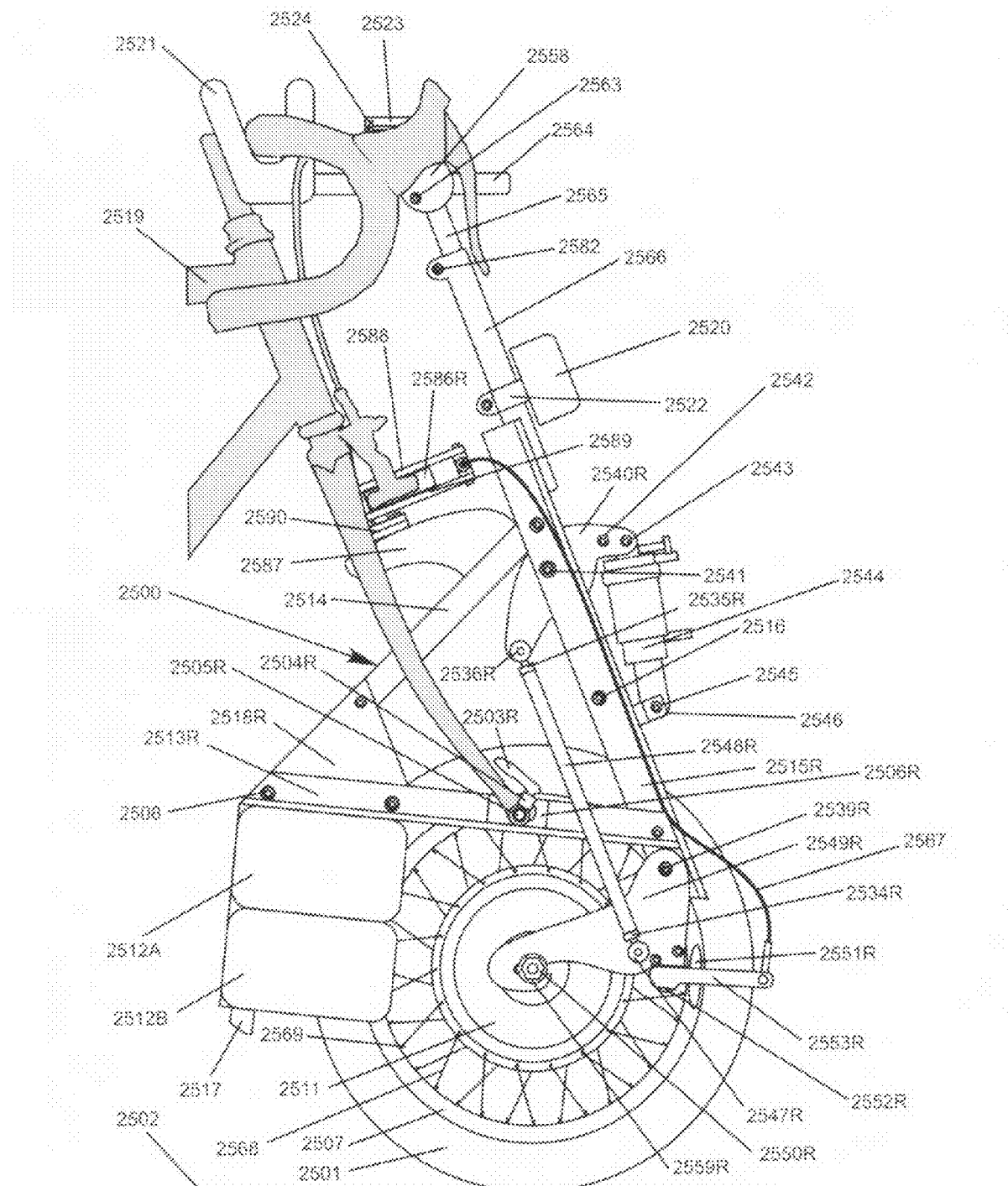
FIG. 8 is an external view of the right side of a front wheel of this invention, shown attached to a standard bicycle with road style handlebars.

FIG. 8 shows a view of the right side of a wheel propulsion assembly 2500 specifically configured for use with a bicycle 2519. The wheel propulsion assembly 2500 includes a tire 2501, which contacts a pavement 2502 during normal use. Alternatively, the pavement 2502 may be replaced by an off-road surface at the rider's discretion. The tire 2501 is a standard pneumatic tire, similar to those commonly found on gas powered mopeds. Other types of tire will be suitable, and may be alternatively used. The tire 2501 is attached to a rim 2507 in the usual way for a tire of the indicated dimensions. The rim 2507 is similar to a standard, typically aluminum alloy, moped or BMX bicycle wheel rim. In this version of the invention, the rim 2507 is attached to and concentric with a hub motor 2511. The hub motor 2511 is similar to a model 400 series hub motor manufactured by Crystalyte. A plurality of spoke nipples 2569 are mechanically attached to the rim 2507. The spoke nipples thread onto the ends of a plurality of spokes 2568. The spokes 2568 attach to a pair of flanges machined from either side of the hub motor 2511.

The wheel propulsion assembly 2500 attaches to the bicycle 2519 by twisting a pair of quick release levers 2503LR. The quick release levers 2503LR tighten using an eccentric cam mechanism similar to that used by quick release assemblies found on many bicycle wheels currently sold. The bicycle 2519 has a steering column, with a handlebar, descending to a front fork, the fork having a pair of opposing legs, each leg having a lower dropout. Note that unlike a conventional bicycle wheel, there is no "skewer" between the quick release levers 2503L and 2503R, and they are independently attached to protrusions on either side of the wheel propulsion assembly 2500. A pair of quick release axles 2505LR, embody these protrusions. The pair of quick release axles 2505LR fit into the dropouts of the fork of the bicycle 2519. The pair of quick release axles 2505LR are welded to a pair of horizontal frame members 2513LR and a pair of quick release standoffs 2506LR. The lower ends of the pair of quick release axles 2505LR are attached to the ends of the pair of quick release levers 2503LR by slip fit, such that the pair of quick release handles 2503LR may be twisted about an axis perpendicular to the pair of quick release axles 2505LR. The ends of the pair of quick release levers 2503LR are press fitted to a pair of quick release contact pads 2504LR. The quick release contact pads 2504LR are composed of hard rubber. The quick release contact pads 2504LR are mounted eccentrically with respect to the quick release levers 2503LR, such that twisting the quick release levers 2503LR will clamp the dropouts of the bicycle 2519 to the wheel propulsion assembly 2500. Alternatively, a pair of hold-down toggle clamps, similar to Mcmaster-Carr part # 5128A23, may be attached to the pair of horizontal frame members 2513LR and used to clamp the dropouts of the bicycle 2519 to the pair of quick release standoffs 2506LR, once the pair of quick release axles 2505LR are inserted into the dropouts. Also, as a further separate alternative, bolts may be used to secure the wheel propulsion assembly 2500 to the bicycle 2519, for a more permanent installation.

The wheel propulsion assembly 2500 includes a frame to support the various propulsion components. This frame is of triangulated design, with separate left and right members for the fore and bottom sections of the triangle. These separate members allow clearance of the tire 2501 within the frame. The frame may alternatively be welded or bolted together, or cast as a single part. The pair of horizontal frame members 2513LR are fabricated from angle shaped aluminum extrusions. The pair of horizontal frame members 2513LR are bolted to a diagonal frame member 2514, and a pair of vertical frame members 2515LR by a plurality of frame assembly bolts 2508. The diagonal frame member 2514 is fabricated from a channel shaped aluminum extrusion. The pair of vertical frame members 2515LR are fabricated from tee shaped aluminum extrusions. The pair of vertical frame members 2515LR are attached to each other at the top by being bolted to the diagonal frame member 2514, and at the center by a vertical frame member spacer bolt 2516. A pair of battery support brackets 2518LR is bolted to the diagonal frame member 2514 and the to pair of horizontal frame members 2513LR, such that the pair of battery support brackets 2518LR form gussets to further strengthen the fame assembly. A standalone support 2517 supports the wheel propulsion assembly 2500 if it is removed from the bicycle 2519. The standalone support is bolted to the pair of battery support brackets 2518LR.

The wheel propulsion assembly 2500 includes a suspension assembly, which allows motion of the tire 2501 in a direction substantially perpendicular to the pavement 2502. This suspension assembly is of trailing link design, since the axle of the hub motor 2511 is located aft of a suspension pivot point, defined here by a pair of trailing link pivot bolts 2539LR. The pair of trailing link pivot bolts 2539LR are shoulder bolts, or may alternatively be standard bolts, covered by sleeves which serve as inner bearing races. The pair of trailing link pivot bolts 2539LR are bolted to the pair of vertical frame members 2515LR. A pair of trailing links 2549LR are attached to the pair of trailing link pivot bolts 2539LR in such a manner as to allow the pair of trailing links 2549LR to swing about the pair of trailing link pivot bolts 2539LR. This is accomplished with sleeve bearings, which are press fit into the pair of trailing links 2549LR and are not shown. The pair of trailing links 2549LR terminate in forward facing dropouts, which contain the ends of the axle of the hub motor 2511. Horizontal position (fore and aft) of the tire 2501 is thus adjustable, such that trail may be added or subtracted by the rider, as dictated by actual performance. The hub motor 2511 is bolted to the pair of trailing links 2549LR with a pair of axle nuts 2550LR. A pair of anti-rotation washers 2559LR are attached under the axle nuts 2550LR. The pair of anti-rotation washers 2559LR include tabs, which insert into the axle slots in the pair of trailing links 2549LR. The inner diameter of the anti-rotation washers 2559LR includes flats, which conform to flat surfaces on the axle of the hub motor 2511. The pair of anti-rotation washers 2559LR thus prevent rotation of the axle of the hub motor 2511 with respect to the pair of trailing links 2549LR. A pair of lower connecting rod ends 2547LR, are bolted to the pair of trailing links 2549LR. The pair of lower connecting rod ends 2547LR are threaded into the bottom ends of a pair of suspension connecting rods 2548LR. The upper ends of the pair of suspension connecting rods 2548LR include threads for attaching a pair of upper connecting rod ends 2536LR. The pair of upper connecting rod ends 2536LR and the pair of lower connecting rod ends 2547LR are of ball joint design to accommodate any misalignment and allow smooth suspension motion. The pair of lower connecting rod ends 2547LR are left hand threaded, and the pair of upper connecting rod ends 2536LR are right hand threaded, so that spinning either of the pair of suspension connecting rods 2548LR will shorten or lengthen the effective connecting rod length. A pair of lower connecting rod locknuts 2534LR and a pair of upper connecting rod locknuts 2535LR may be tightened to lock the length adjustment. The pair of upper connecting rod ends 2536LR are affixed to a pair of suspension rocker arms 2540LR through a connecting rod coupling shaft 2538, which will be shown in FIG. 9. The pair of suspension rocker arms 2540LR pivot about a rocker arm pivot bolt 2541. The rocker arm pivot bolt 2541 is a shoulder bolt that is secured by a nut on the left side to the vertical frame member 2515L. The rocker arm pivot bolt 2541 may alternatively be a standard bolt, covered by a sleeve to serve as an inner bearing race. The pair of suspension rocker arms 2540LR are held together at the forward end by a rocker arm spacer bolt 2542. A sleeve surrounding the rocker arm spacer bolt 2542 along its length between the pair of suspension rocker arms 2540LR is not shown. The rocker arm spacer bolt 2542 is secured to the suspension rocker arm 2540L by a nut, which is not shown. An upper shock pivot bolt 2543 is bolted to the suspension rocker arms 2540LR. The upper shock pivot bolt 2543 passes through a mounting hole and bushing in the end of a suspension shock 2544. The suspension shock 2544 is located between the pair of suspension rocker arms 2540LR. The suspension shock 2544 is an air shock, similar to the SID rear shock manufactured by Rockshox, requiring about 600 pounds to compress it 1½ inches. The suspension shock 2544 may alternatively be of oil dampened spring design, or other design as will be apparent to those skilled in the art. A lower shock pivot bolt 2545 secures the lower mounting end of the suspension shock 2544 to a lower shock support bracket 2546. The lower shock support bracket 2546 is bolted to the vertical frame members 2515LR. The above described suspension assembly allows about three inches of vertical wheel travel as 300 pounds are applied to the tire 2501 in a substantially vertical direction.

An alternative suspension assembly may incorporate a dampened torsion spring at the trailing link pivot bolt 2539LR. Such a torsion spring may be similar to those sold by henschenaxle.com. This torsion spring could replace suspension components between the pair of lower connecting rod ends 2547LR and the lower shock support bracket 2546.

Materials for the frame and suspension assembly components are chosen for high strength and stiffness to weight and cost ratios. They may be composed of metal, such as steel alloy or aluminum alloy. Other metals such as titanium or magnesium, or high performance plastics or composite materials may also be used for most structural components.

The wheel propulsion assembly 2500 includes a brake assembly. A brake cable sheath 2567 contains an inner brake cable 2591, as will be shown in FIG. 10. Pulling the inner brake cable forces a pair of cantilever brake arms 2553LR together, moving a pair of brake pads 2551LR into contact with the rim 2507. The aft ends of the cantilever brake arms 2553LR pivot about a pair of spring-loaded brake pivot bolts 2552LR. The cantilever brake arms 2553LR are functionally similar to cantilever brake arms currently used on many mountain bicycles. The brake pivot bolts 2560LR are threaded into a pair of lugs, which are bolted to the inside of the pair of trailing links 2549LR and are not shown. The brake cable sheath 2567 is held in place against the cantilever brake arm 2553R by the spring action of the brake pivot bolts 2560LR. The inner brake cable 2570 is pulled between an upper brake interface lever 2588 and a lower brake interface lever 2589 as the front brake lever of the bicycle 2519 is actuated. The upper brake interface lever 2588 and the lower brake interface lever 2589 are rotatably attached to a pair of brake interface contact pads 2586LR. The pair of brake interface contact pads 2586LR fit between the front brake pads of the bicycle 2519. The brake interface levers swing about a brake interface pivot bolt 2584, as will be shown in FIG. 10. The brake interface pivot bolt 2584 is threaded into a brake interface mount flange 2590, which is curved about an arc centered on the quick release axles 2505LR. The curved underside of the brake interface mount flange 2590 mates with a complimentary surface on the top of a brake interface support 2587. Several holes are tapped into the upper surface of the brake interface support 2587, so that the brake interface mount flange 2590 may be bolted to the brake interface support 2587 at various places along its length. For a given wheel size, the brake interface contact pads 2586LR are always the same distance from the dropouts on the fork of the bicycle 2519. Thus, the fore and aft position adjustment of the brake interface contact pads 2586LR is facilitated by the curvature of the brake interface mount flange 2590, such that the brake interface contact pads 2586LR are centered on the front brake pads of the bicycle 2519.

The pair of battery support brackets 2518LR support several battery cases 2512ABCD, which enclose rechargeable battery cells capable of storing energy for driving the hub motor 2511. Proper positioning of the battery cases 2512ABCD places the center of mass of the bicycle steering column slightly forward of the steering axis, dampening "shimmy," or oscillations due to roughness in the pavement 2502, yet allowing steering to occur as the bicycle is leaned from side to side. The center of mass of the battery cases 2512ABCD, and enclosed battery cells, is below the steering column fork dropouts and aft of the steering axis of the bicycle 2519.

Rotation of the wheel propulsion assembly 2500 in either direction about the pair of quick release axles 2505LR, is prevented by bringing an anti-rotation assembly affixed to the frame assembly into contact with the handlebar of the bicycle 2519. An anti-rotation contact pad 2521 is composed of hard rubber or similar material, and contacts the handlebar of the bicycle 2519. The anti-rotation contact pad 2521 includes a tapered recess to accommodate the handlebar of the bicycle 2519. The tapered geometry serves to minimize any adjustment that may be required to fit various bicycle handlebar diameters. A horizontal anti-rotation member 2564 is attached to the anti-rotation contact pad 2521. The horizontal anti-rotation member is attached to an anti-rotation member coupling 2558. The anti-rotation member coupling 2558 is supported by an upper anti-rotation member 2565. The anti-rotation coupling 2558 is cylindrical, with a hole to accommodate the horizontal anti-rotation member 2564, and a slit cut through to one side of this hole such that the slit is compressed by tightening a horizontal anti-rotation lock bolt 2563. Elsewhere in this specification, this type of clamp is referred to as a split cylindrical design. The upper anti-rotation member 2565 fits into a lower anti-rotation member 2566, since both parts are tubular in cross section and sized to be nestable. The lower anti-rotation member 2566 is welded to the pair of vertical frame members 2515LR. Proper positioning of the anti-rotation pad 2521 on any bicycle is accomplished by loosening a vertical anti-rotation lock bolt 2582 and the horizontal anti-rotation lock bolt 2563, followed by proper adjustment for handlebar geometry, and retightening. Implementation of the vertical anti-rotation lock bolt 2582 may be accomplished using a conventional seat post clamp. Alternatively, the anti-rotation assembly may engage the steering column of the bicycle 2519 at a point other than the handlebars.

Control of the hub motor 2511 is accomplished with a throttle control 2523. A cable (hidden in the anti-rotation assembly) carries electrical information and power to and from the throttle control 2523 to a motor controller 2520. The motor controller 2520 is attached to the lower anti-rotation member 2566 by a motor controller mount 2522. The motor controller 2520 is a pulse width modulated controller designed for use with the hub motor 2511. The throttle control 2523 is attached to the anti-rotation member coupling 2558, so that it is close to the bicycle handlebar. The throttle control 2523 is similar to the throttle control TB-01 manufactured by Crystalyte. A throttle control lever 2524 extends from the throttle control 2523, so that the rider can manually operate it. The throttle control 2523 may include flutes so that the rider's thumb may hold the throttle control lever 2524 in repeatable positions corresponding to cruise settings. The throttle control lever 2524 is spring loaded, so that it returns to the unpowered state as the thumb is removed. As the rider uses the hand to apply the brakes, the thumb is almost necessarily removed from the throttle control lever 2524. Alternatively, the throttle control 2523 may be secured to the anti-rotation member 2564 by an adjustable arm or "gooseneck" section to accommodate other handlebar styles. The throttle control 2523 may include a momentary contact "kill switch" capable of disabling the motor through a relay. Restarting the motor would require pushing a "start" button or turning a keyswitch.

Figure 9:
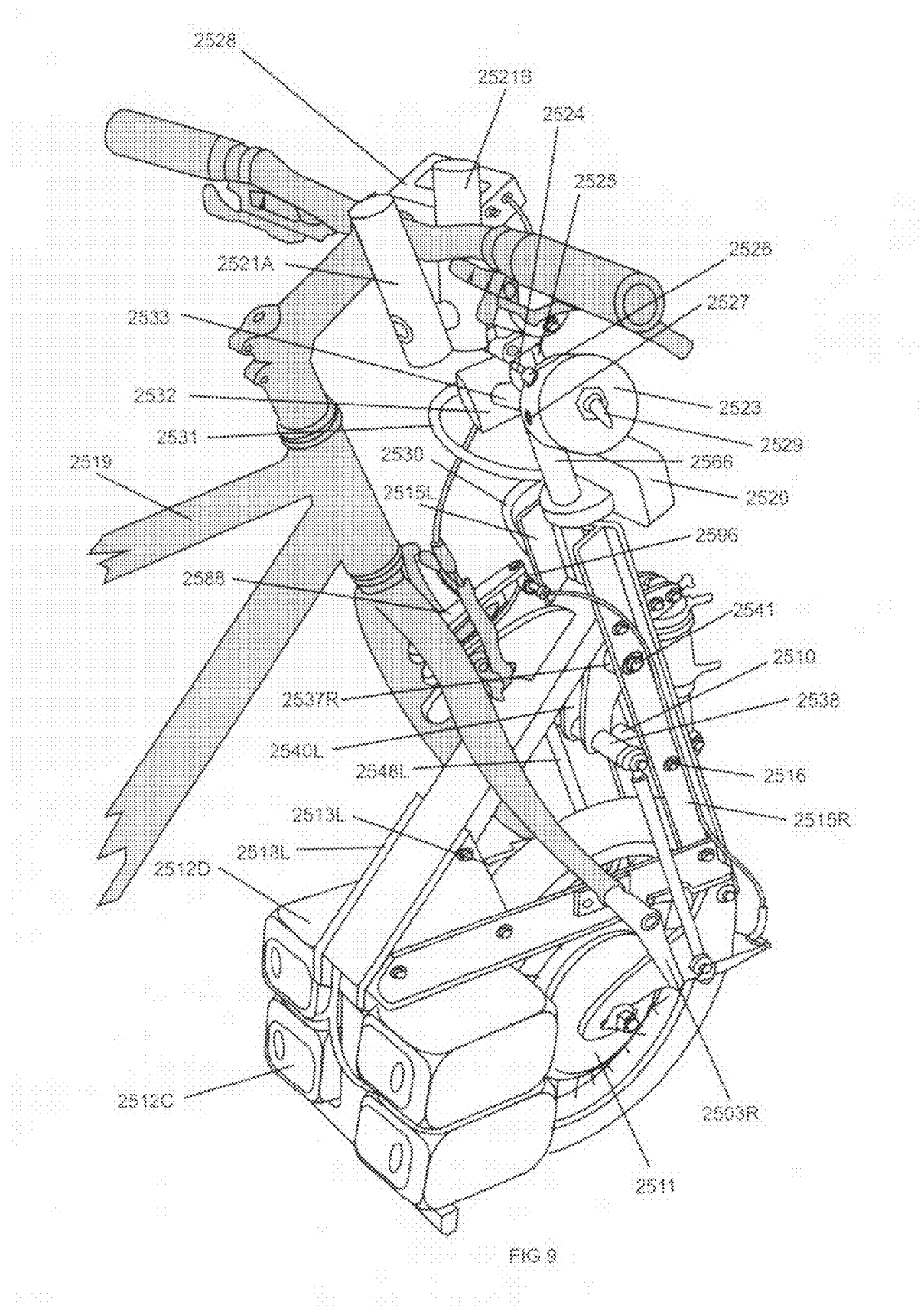
FIG. 9 is an external perspective view of the right rear side of the wheel of FIG. 8, shown attached to a standard bicycle with straight handlebars.

FIG. 9 is a perspective drawing of the wheel propulsion assembly 2500, as seen from the right rear side and adapted for use with a bicycle 2519 incorporating a straight handlebar. This perspective view reveals some left side components, which compliment the right side components depicted in FIG. 8 and are previously described.

A vertical frame member spacer sleeve 2510 surrounds the vertical frame member spacer bolt 2516 between the pair of vertical frame members 2515LR. The vertical frame member spacer sleeve 2510 thus defines the distance between the pair of vertical frame members 2515LR. A right rocker arm pivot sleeve 2537R surrounds the rocker arm pivot bolt 2541 between the right suspension rocker arm 2540R and the right vertical frame member 2515R, defining the distance between the latter two parts. A left rocker arm pivot sleeve 2537L defining the distance between complimentary parts on the left side of the wheel propulsion assembly 2500 is not shown. A brake cable retainer 2596 is bolted to the upper brake interface lever 2588, to support the brake cable sheath 2567, as will be shown more clearly in FIG. 10. The anti-rotation contact pad 2521 is here comprised of two separate cylinders 2521A and 2521B, which are bolted to the horizontal anti-rotation member 2564.

A motor control system is located below the straight handlebar, for access by the rider's thumb. A throttle control bracket 2532 of split cylindrical design clamps onto the lower anti-rotation member 2566. The throttle control bracket 2532 also clamps onto a throttle control support tube 2533. The throttle control 2523 is clamped to the end of the throttle control support tube 2533. The split cylindrical design of the throttle control bracket 2532 allows vertical adjustment by sliding along the lower anti-rotation member 2566, and angular adjustment by rotation about the lower anti-rotation member 2566. Radial adjustment of the throttle control 2523 is accomplished by sliding the throttle control support tube 2533 through the throttle control bracket 2532. Angular adjustment of the throttle control 2523 is accomplished by rotation of the throttle control support tube 2533 within the throttle control bracket 2532. The throttle control 2523 supports the following rider interface components: the throttle control lever 2524, a kill switch 2526, a power indicator light 2527, a speed switch 2529, and a throttle control stop pad 2526. The throttle control lever 2524 is advanced by the rider, who pushes it forward with the right thumb. The rider's right thumb may rest against the throttle control stop pad 2526 to avoid thumb fatigue while the throttle control lever 2524 is held in a fixed position for some time. The speed switch 2529 controls the speed setting of the hub motor 2511, which includes a dual speed feature. A throttle control cable 2531 passes from the throttle control 2523, through the throttle control support tube 2533, and on to the motor controller 2520. The throttle control cable 2531 includes electrical conductors for all of the above described rider interface components. A controller cable 2530 carries electrical power from the motor controller 2520 to the hub motor 2511. Information about battery performance, speed, and remaining charge are provided to the rider by a speedometer/charge indicator 2528, which is clamped to the anti-rotation member coupling 2558. The speedometer/charge indicator 2528 is similar to the DrainBrain, manufactured by Ebikes.ca.

The pair of quick release levers 2503LR attach to the pair of quick release axles 2505LR, which are threaded in the adaptation shown in FIG. 9. The pair of quick release levers 2503LR include internal threads and can be loosened only while pushing in on the handle. The pair of quick release levers 2503LR are similar in design to McMaster-Carr part # 6506K45.

Figure 10:
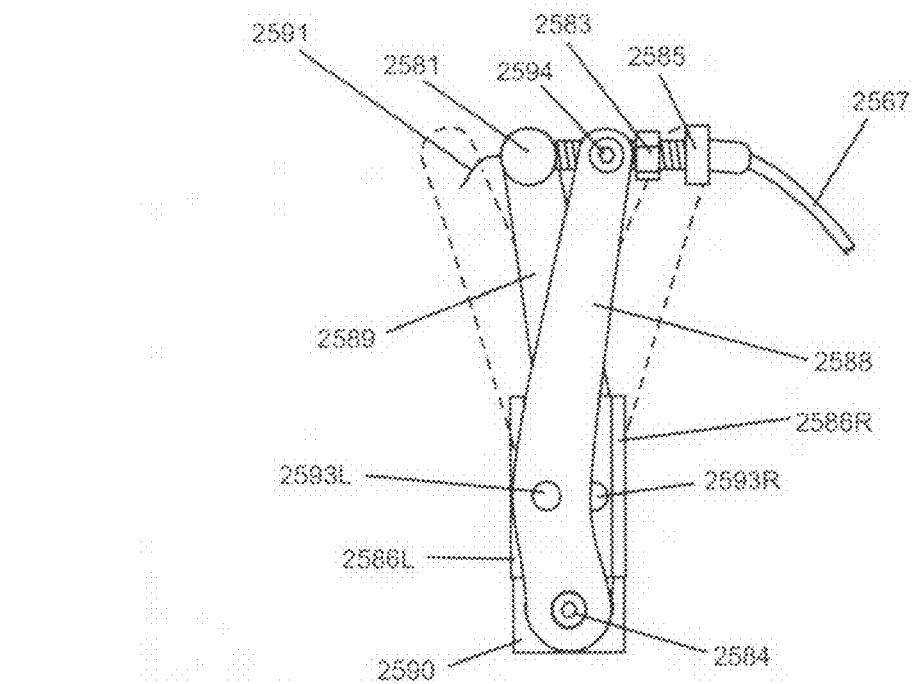
FIG. 10 is a detail of a mechanical brake actuator for the wheel of FIG. 9, as viewed from the top.

FIG. 10 is a detail of the mechanical brake actuator for the wheel propulsion assembly of FIG. 8, as viewed from the top.

This detail indicates how actuation of the existing front brake lever of the bicycle 2519 actuates the brake on the wheel propulsion assembly 2500. As the front brake of the bicycle 2519 is actuated, the existing brake pads move closer together, and would ordinarily contact the rim of a conventional bicycle wheel. When the wheel propulsion assembly 2500 is properly installed, the existing brake pads contact the pair of brake interface contact pads 2586LR. The pair of brake interface contact pads 2586LR are slip fit onto a pair of contact pad pivots 2593LR, so that they are free to rotate. Flanges in the ends of the pair of contact pad pivots 2593LR prevent the pair of brake interface contact pads 2586LR from sliding off the ends. The contact pad pivot 2593L is press fit into the upper brake interface lever 2588, and the contact pad pivot 2593R is press fit into the lower brake interface lever 2589. The upper brake interface lever 2588 and the lower brake interface lever 2589 pivot about the brake pivot bolt 2584. The brake pivot bolt 2584 is a shoulder bolt, and its smooth outer diameter is sized for a slip fit into sleeve bearings which are press fit into the upper and lower brake interface levers 2588 and 2589. The brake pivot bolt 2584 may alternatively be a conventional bolt covered by a sleeve to serve as the inner bearing race. As the existing brake pads of the bicycle 2519 move closer together, the top ends of the upper brake interface lever 2588 and the lower brake interface lever 2589 move farther apart, as indicated by the dashed outlines of the latter two parts. One end of the brake cable 2591 is affixed to the lower brake interface lever 2589 by a brake interface cable clamp 2581. The brake interface cable clamp 2581 is bolted to the lower brake interface lever 2589 in a manner which compresses and secures the brake cable 2591. The brake interface cable clamp 2581 is used for coarse length adjustment of the brake cable 2591, and hence the spacing between the pair of brake pads 2551LR. One end of the brake cable sheath 2567 is affixed to a hole in a cable length adjustment bolt 2585. A cable length adjustment nut 2583 is threaded onto the cable length adjustment bolt 2585. The cable length adjustment bolt 2585 also threads into the brake cable retainer 2596. The brake cable retainer 2596 is bolted to the upper brake interface lever 2588 by a brake interface cable support bolt 2594. Proper adjustment of the cable length adjustment bolt 2585 simplifies brake adjustment and wheel installation by providing a fixed distance between the ends of the intermediate brake levers when the brake is not actuated. Securing the cable length adjustment nut 2583 against the brake cable retainer 2596 locks cable length adjustment.

Figure 11:
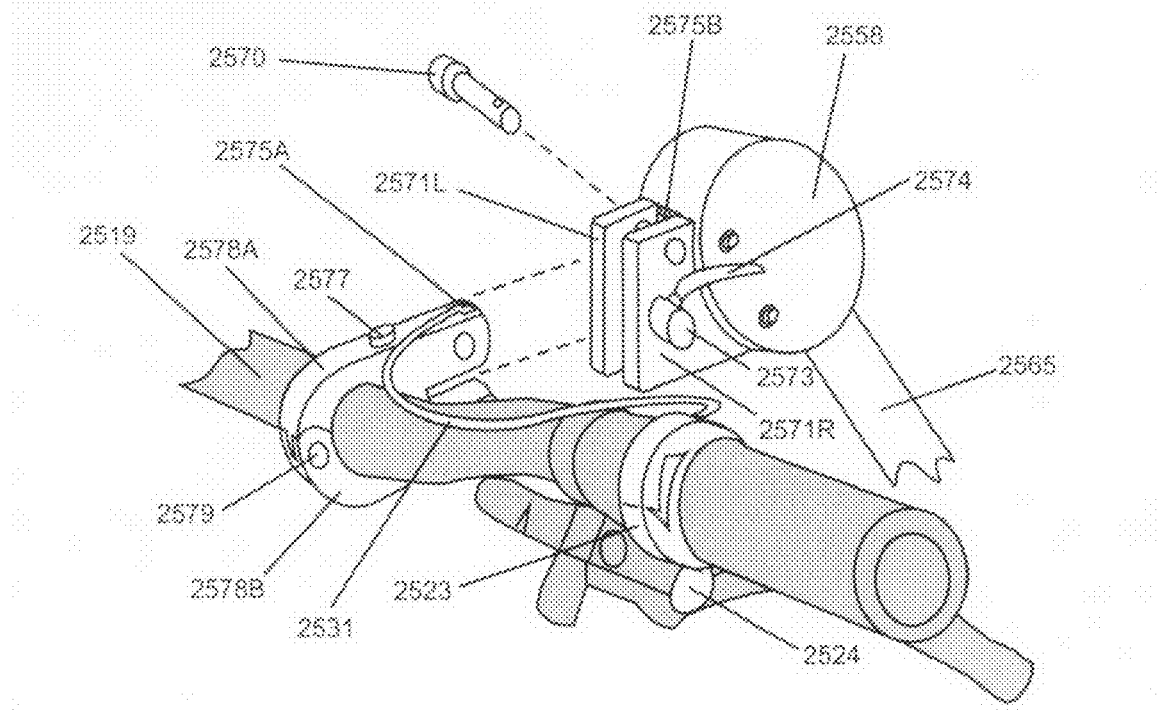
FIG. 11 is an external perspective view of an alternate handlebar attachment means for the wheel of FIG. 9, as viewed from the right rear.

FIG. 11 shows a perspective view of an alternative means to attach the wheel propulsion assembly 2500 to the handlebar of the bicycle 2519. This alternative may provide more secure attachment, especially in the lateral direction. Several parts are more permanently affixed to the handlebar of bicycle 2519, and remain when the wheel propulsion assembly 2500 is removed. An anti-rotation handlebar clamp 2578AB is installed on the handlebar of the bicycle 2519 by swinging the two halves together about an anti-rotation clamp pivot 2579, and tightening an anti-rotation clamp bolt 2577. The anti-rotation clamp pivot 2579 is press fit into the anti-rotation handlebar clamp 2578A, and slip fit into the anti-rotation handlebar clamp 2578B. The anti-rotation clamp bolt 2577 is threaded into the anti-rotation handlebar clamp 2578B, and slip fit into a hole passing through the anti-rotation handlebar clamp 2578A. The throttle control 2523 is clamped directly to the handlebar of the bicycle 2519 using a set screw. The throttle control lever 2524 rotates counterclockwise to increase motor power, and is actuated by the rider's thumb. The throttle control cable 2531 connects the throttle control 2523 to a throttle control connector 2575A, which is bonded to the end of the anti-rotation handlebar clamp 2575A. The throttle control connector 2575A electrically mates with a throttle control connector 2575B upon installation of the wheel propulsion assembly 2500 on the bicycle 2519. The throttle control connector 2575B is embedded in the anti-rotation member coupling 2558, and is electrically connected to the motor controller 2520. A pair of anti-rotation coupling plates 2571LR are bolted to the anti-rotation member coupling 2558, and spaced apart to allow clearance of the anti-rotation handlebar clamp 2578AB. An anti-rotation quick release lever 2574 is twisted to compress the pair of anti-rotation coupling plates 2571LR together around the anti-rotation handlebar clamp 2578AB. The anti-rotation quick release lever 2574 is coupled on an eccentric pivot to an anti-rotation quick release nut 2573. The anti-rotation quick release nut 2573 is attached to a bolt which terminates in a nut on the other side of the pair of anti-rotation coupling plates 2571LR. An anti-rotation coupling pin 2570 acts as a safety device to retain mechanical connection between the bicycle 2519 and the wheel propulsion assembly 2500, even if the anti-rotation quick release lever 2574 is opened. The anti-rotation coupling pin 2570 passes through holes in the pair of anti-rotation coupling plates 2571LR and the anti-rotation handlebar clamp 2578A. The throttle control connector 2575AB may alternatively carry an electrical signal from a switch mounted in the brake lever of the bicycle 2519, and this brake signal may be used to disable the hub motor 2511, or actuate an electromechanical brake, thus replacing the brake interface assembly shown in FIG. 10.

Referring to FIGS. 8 and 11, more secure attachment of the wheel propulsion assembly 2500 may alternatively be obtained by bolting the anti-rotation handlebar clamp 2578B, directly to the horizontal anti-rotation member 2564. The throttle control 2523 remains on the wheel propulsion assembly 2500, as shown in FIG. 8. The anti-rotation clamp bolt 2577 may be a quick release type mechanism that swings laterally to allow the anti-rotation handlebar clamp 2578A to swing into place. Other means of securing the wheel propulsion assembly 2500 to the bicycle 2519 may use a strap or other tubing clamp, as will be apparent to those skilled in the art.

While the shock absorbing system on the invention shown in FIGS. 8 and 9 is a trailing link suspension, other suspension systems may also be used within the invention, and include a leading link suspension system, a telescoping fork suspension system, leaf springs and the like as will be apparent to those skilled in the art. For a general discussion of two wheel motorized vehicle suspensions, see "Motor-cycle Chassis Design," written by Tony Foale and Vic Willoughby; published by Osprey Press, London, 1984.

What is claimed is:

1. A wheel propulsion assembly for a bicycle having a steering column with a steering axis, said steering column including a handlebar descending to a front fork, said fork having a pair of opposing legs, each leg having a lower dropout; said wheel propulsion assembly comprising:

(a) a suspension system having protrusions, said system being mounted on said bicycle by insertion of said protrusions in said lower dropouts, (b) said suspension system further comprising a motor driven rotatable wheel with a wheel axle located concentrically therein; wherein the rotatable wheel is driven by a hub motor; wherein said protrusions are situated along an axis spaced parallel to and non-coincident with said wheel axle, (c) said wheel axle being movable with respect to said protrusions mounted within said dropouts.

2. The wheel propulsion assembly of claim 1, wherein said wheel movement is substantially parallel to said steering axis of said steering column.

3. The wheel propulsion assembly of claim 1, wherein said wheel movement is substantially vertical.

4. The wheel propulsion assembly of claim 1, wherein said suspension system further comprises a restraining member, said restraining member being in fixed relationship to said protrusions and extending from said assembly to said steering column.

5. The wheel propulsion assembly of claim 4, wherein said restraining member is rigidly attached to said steering column.

6. The wheel-propulsion assembly of claim 1, wherein said suspension system further comprises an energy absorbing member movably mounted therein, said movement of said energy absorbing member isolating vibration of said wheel from said protrusions.

7. The wheel propulsion assembly of claim 6, wherein said suspension system further comprises trailing link suspension system.

8. The wheel propulsion system of claim 6, wherein said suspension system further comprises a triangulated frame design.

9. The wheel propulsion assembly of claim 1, wherein said suspension system further comprises at least one dropout for mounting said wheel axle therein, the position of said axle being adjustable within said dropout.

10. The wheel propulsion assembly of claim 1, further comprising controls for defining the operation of said wheel propulsion assembly, said controls being located on said wheel propulsion, assembly such that installation of said wheel propulsion assembly on said bicycle by inserting said protrusions in said dropouts effects automatic installation of said controls on said bicycle.

11. The wheel propulsion assembly of claim 1, further comprising controls being mounted on said handlebar.

12. The wheel propulsion assembly of claim 1, further comprising a braking system having a brake lever located on said steering column; said brake lever actuating a brake means on said wheel.

13. The wheel propulsion assembly of claim 4, wherein said restraining member engages said steering column at said handlebar.

14. The wheel propulsion assembly of claim 5, wherein said restraining member is rigidly attached to said steering column at said handlebar.

15. The wheel propulsion assembly of claim 1, further comprising an energy storage means, the center of gravity of said energy storage means being below said steering column fork lower dropouts.

16. The wheel propulsion device of claim 12, wherein said braking system comprises a cantilever, caliper, disk or drum brake.

17. The wheel propulsion device of claim 1, wherein a transmission means is included in said wheel propulsion assembly between said hub motor and said rotatable wheel, said transmission means transmitting rotational energy between said hub motor and said rotatable wheel.

18. The wheel propulsion device of claim 17, wherein said transmission means comprise a belt and pulleys, chain and sprockets, gears, or shafts.

19. The wheel propulsion assembly of claim 1 wherein said suspension system comprises a rocker arm, and an energy absorbing member, said rocker arm being coupled to a secondary fork.

20. The wheel propulsion assembly of claim 1, wherein said suspension system comprises a fixed pivot supporting a pivot shaft forward of said wheel axle such that said wheel axle swings on an arc about said pivot shaft.

* * * * *